United States Patent [19]
Abdul

[11] Patent Number: 5,122,092
[45] Date of Patent: Jun. 16, 1992

[54] POWER SKINNING KNIFE WITH REMOVABLE DRIVE MECHANISM AND HIGH EFFICIENCY PNEUMATIC MOTOR

[75] Inventor: Michael A. Abdul, Middletown, Conn.

[73] Assignee: Jarvis Products Corporation, Middletown, Conn.

[21] Appl. No.: 450,228

[22] Filed: Dec. 13, 1989

[51] Int. Cl.⁵ ............................................. A22B 5/16
[52] U.S. Cl. ...................................... 452/133; 30/219
[58] Field of Search ................. 17/21, 52; 30/219, 216, 30/217, 208; 452/125, 133, 132

[56] References Cited

U.S. PATENT DOCUMENTS

| | | | |
|---|---|---|---|
| 4,368,560 | 1/1983 | Wetzel et al. | 17/21 |
| 4,901,400 | 2/1990 | Karubian | 17/50 |

Primary Examiner—Willis Little
Attorney, Agent, or Firm—DeLio & Associates

[57] ABSTRACT

A power skinning knife with a drive mechanism that may be easily removed for cleaning and a high efficiency pneumatic motor. The main drive gear is located on the same side of the pinion gear as the drive mechanism cover plate permitting removal of the drive mechanism without removing the drive motor. Other improvements include a replaceable main bearing plate in case of bearing failure damage, a combined drive mechanism cover and barrier plate manufactured of a different material than the remained of the housing to increase wear resistance, hollow drive pins to reduce the oscillating mass and operating vibration, and a spring mounting for the motor to assure accurate alignment of the motor and gearing system after each disassembly of the tool. The pneumatic motor comprises an improved sealing system to increase efficiency, an overlappingly staggered exhaust venting system to decrease operating noise, and a rotor using a slip fitted bearing and anti-slip O-ring design that may be disassembled by hand for cleaning.

19 Claims, 2 Drawing Sheets

POWER SKINNING KNIFE WITH REMOVABLE DRIVE MECHANISM AND HIGH EFFICIENCY PNEUMATIC MOTOR

BACKGROUND OF THE INVENTION

1. Field of the Invention

This invention relates to power skinning knives for removing the hide of slaughtered animals. More specifically, this invention relates to a pneumatically powered skinning knife of the type including a pair of cutting disks driven in opposed cutting oscillations.

2. Description of related art

Power skinning knives employing a pair of oscillating cutting disks are well-known in the art. A modern design includes a pair of adjacent cutting disks, each cutting disk having a plurality of cutting teeth on its circumference. The disks are driven in their opposed cutting oscillations by a pair of pushrods connected to an eccentric drive mechanism operated by a pneumatic motor mounted in the handle of the tool.

Power skinning knives according to this design are described in U.S. Pat. Nos. 4,368,560 and 3,435,522. A similar design is seen in U.S. Pat. No. 2,751,680.

Due to the environment in which these knives are operated and the function which they perform, the gearing and drive mechanism frequently become contaminated with dirt, blood, grease, hair, etc., requiring regular cleaning.

The earliest tools of this type had a very poor seal between the drive mechanism and the cutting mechanism, which allowed frequent contamination of the gears and pushrods of the drive mechanism. The tools were also difficult to open for cleaning, and once open, the drive mechanism could not easily be removed for a thorough cleaning, requiring that the mechanism be cleaned in place. Subsequent designs were somewhat easier to disassemble for cleaning, but still provided inadequate sealing between the cutting and driving mechanisms.

More modern knives such as that shown in U.S. Pat. No. 4,368,560 have been designed with a barrier plate separating the drive mechanism from the cutting disks. Furthermore, a removable cover has been provided to gain access to the drive mechanism for regular cleaning in place. These changes significantly reduced contamination. However, the barrier plate design, while improving the seal between the cutters and the gears, made it impossible to remove the drive mechanism without complete removal of the motor from the housing. Such removal requires special tools which discourages regular maintenance and thorough cleaning.

Moreover, the design of the tool is such that removing the motor from the housing produces wear in the internal pneumatic passageways of the tool causing a loss of pneumatic efficiency each time the unit is disassembled.

A further disadvantage of prior art designs is that the barrier plate separating the cutting disks from the drive mechanism is designed as an integral part of the handle. Because the barrier plate also serves as a bearing surface which is in contact with one of the cutting disks, it needs to be sufficiently hard to avoid premature wear. It would be preferable to make it of steel rather than of the lightweight aluminum typically used for the handle. However, the one piece design means that the bearing surface is made of the same material as the handle, and thus it must be treated with a hardening process to give it the necessary wear-resistance.

Another disadvantage of prior art designs is the high noise level and vibration encountered during use. Still another disadvantage of prior art designs is that a failed main drive bearing often destroyed the housing for the tool requiring the replacement of both the housing and the main drive bearing.

Accordingly, it is an object of the present invention to provide a power skinning knife with a member separating the cutting and driving mechanisms in which the drive mechanism is easily accessible for cleaning through a removable drive mechanism cover and wherein the drive mechanism is removable without the necessity of removing the motor.

A further object of the invention is to provide a skinning knife in which the portion of the tool against which the cutting disks bear can be made of a different material than the handle, permitting the selection of a harder and more wear-resistant material for this portion of the knife.

Another object of the present invention is to provide a skinning knife in which the motor operates with high pneumatic efficiency and in which removal of the motor and disassembly of the tool does not degrade subsequent performance of the tool.

Still another object of the invention is to provide a motor design which may be easily disassembled by hand for cleaning and repair. A further object of the invention is to provide a power skinning knife which produces less noise and vibration than prior art designs.

Yet another object of the invention is to provide a removable main drive bearing mounting member which may be replaced if damaged due to the failure of the main drive bearing.

SUMMARY OF THE INVENTION

In keeping with these objects and with other objects of the invention which will become apparent hereinafter, the present invention comprises a power skinning knife having a pair of cutting disks driven in opposed cutting oscillations by a drive mechanism. The drive mechanism includes an eccentric, a main drive gear connected to the eccentric, and a pair of pushrods, one for each cutting disk, each pushrod being connected between the eccentric and its respective cutting disk. A motor is provided for driving the main drive gear. The motor and the drive mechanism are mounted in a housing which includes a main body comprising a handle and a first blade cover, a second blade cover, and a drive mechanism cover mounted on the main body which may be removed to provide access to the drive mechanism. The drive mechanism is mounted within the housing such that it may be removed therefrom by removing the drive mechanism cover without the necessity of removing the motor.

In the preferred embodiment, the motor is pneumatically driven and comprises a pressure manifold and a casing having a drive chamber, at least one drive vent for venting pressurized air into the drive chamber, and at least one exhaust vent for directing pressurized air out of the drive chamber. A pressure passageway is formed within the casing and connected at one end to the drive vent and at the other end to the pressure manifold. By locating the pressure passageway entirely within the casing, and not employing the inner wall of the handle as part of the pneumatic system leading to the drive vent, the motor and casing may be repeatedly removed without the resulting wear affecting the pneumatic efficiency of the motor.

The casing is preferably provided with a plurality of exhaust vents which are overlappingly staggered relative to one another. This spreads out over time the noises caused as each exhaust vent initially begins its exhaust cycle, thereby diminishing the noise caused by the tool.

In still another improvement, the pushrods are connected to the cutting disks by means of lightweight hollow drive pins. This reduces the mass associated with the oscillating portions of the tool and thereby reduces tool vibration.

Still another improvement comprises designing the motor so that it may be disassembled by hand without special tools by providing a slip fit between the main rotor in the motor, and the inner race of the rotor bearing. A means for preventing slippage between the inner bearing race on the rotor bearing and the rotor shaft is provided which preferably comprises a ring of elastomeric material which contacts both the inner race of the rotor bearing and the rotor shaft.

Other improvements are described in connection with the description of the preferred embodiment.

BRIEF DESCRIPTION OF THE DRAWINGS

For a fuller understanding of the invention, reference should be made to the following description taken in connection with the accompanying drawing(s), in which.

DESCRIPTION OF THE PREFERRED EMBODIMENT

Figure 1:
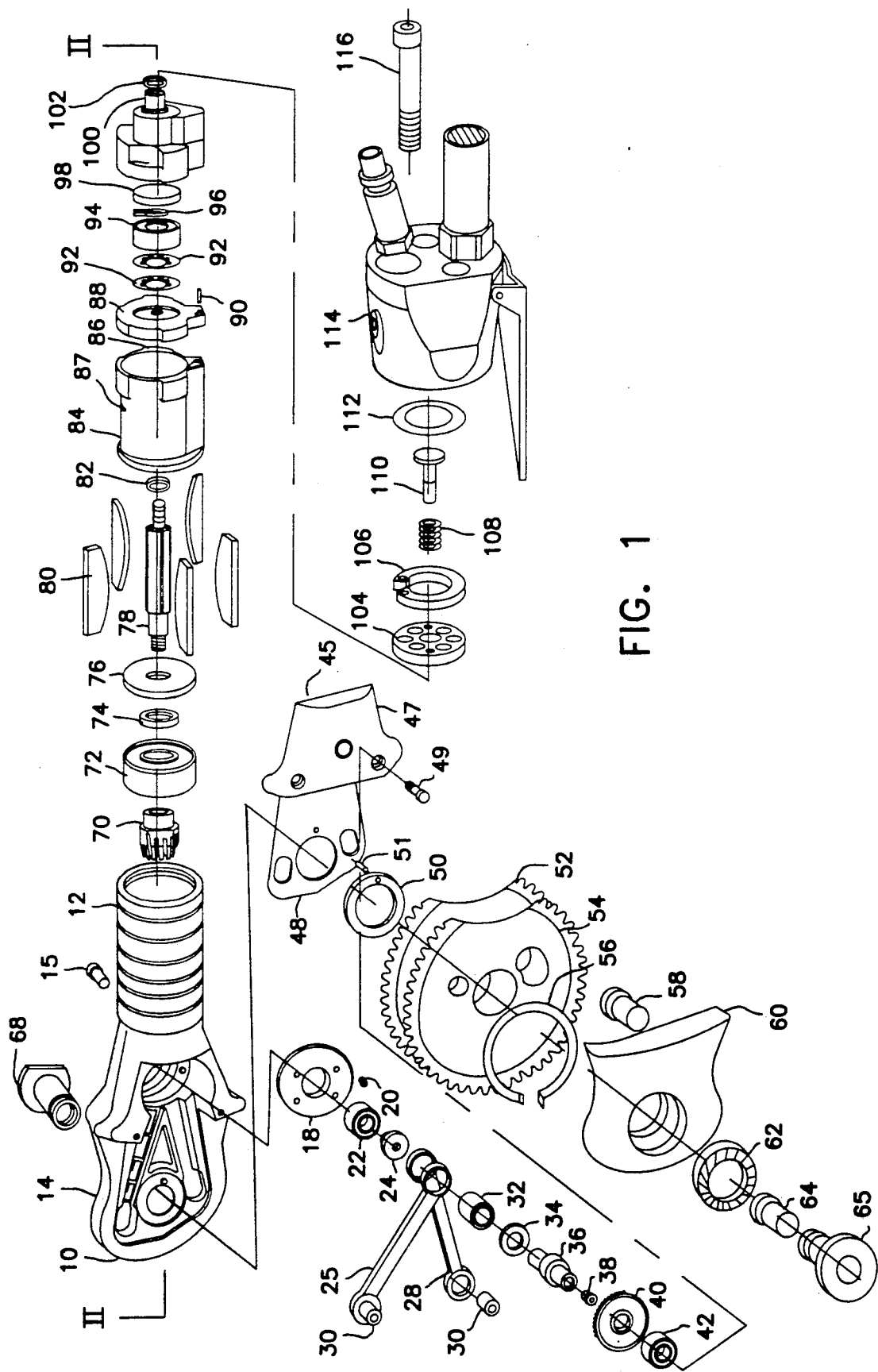
FIG. 1 is an exploded view of the preferred embodiment of the power skinning knife of the present invention.

Referring to FIG. 1, an exploded view of a power skinning knife according to the present invention can be seen. The knife comprises a main body 10 including a handle portion 12, and a first blade cover portion 14.

A drive mechanism comprising components 24 through 40 is mounted within the main body 10. The drive mechanism is mounted between the main drive bearing 22 and secondary drive bearing 42. The main drive bearing 22 is held in the removable bearing mounting member 18 which is attached to the housing by means of four fasteners 20. To avoid repetition in the drawings, whenever multiple fasteners, such as screws and bolts, are used, only one will be shown. Accordingly, only one of the four fasteners 20 is illustrated.

A common failure in power skinning knives is deterioration of the main bearing due to the acids found in the contamination material which enters the bearings. In such a failure, the main drive bearing 22 may lock up and begin to spin damaging the bearing mount. The present design comprises a removable bearing mounting member 18 which may easily be replaced if damaged, without the necessity of replacing the expensive main body 10 as was required in previous designs.

Moreover, the removable design for the bearing mounting member 18 permits it to be manufactured of a more suitable material than the main body 10. It is preferably manufactured of steel for strength and wear resistance rather than the aluminum from which the main body 10 is manufactured.

An eccentric shaft 36 spins between the main bearing 22 and the secondary bearing 42, and is driven by the main drive gear 40. The ends of the eccentric shaft are aligned with the centerline through the drive bearings 22, 42. However, the portion of the shaft where the pushrods 26, 28 are connected is off this centerline, forming the eccentric, and causing the pushrods to oscillate as the eccentric shaft 36 is rotated.

The pushrods 26, 28 are held in position on the eccentric portion of the shaft 36 by bushings 24, 32 and 34. A grease fitting 38 which is accessible when the tool is assembled permits lubrication of the drive mechanism at any time.

Pushrod 28 is connected to cutting disk 52 via its respective hollow drive pin 30. The drive pin engages its respective drive hole in the cutting disk 52 and protrudes through a clearance slot in the non-driven disk 54. Pushrod 26 is connected to cutting disk 54 in a similar manner, such that each disk is driven by its respective pushrod and drive pin. However, the pushrods connect to different quadrants of the cutting disks 52, 54.

As a result, as the eccentric shaft 36 spins, the cutting disks are driven in opposite directions even though the pushrods are driven in substantially the same direction. As the pushrods 26, 28 move in the outward direction, cutting disk 52 rotates clockwise (as seen from the direction of view in FIG. 1), while cutting disk 54 rotates counter clockwise. As the pushrods reverse, the cutting blades also reverse the direction of their rotation. These opposite oscillations, which are repeated thousands of times a minute as the eccentric shaft 36 rotates, cause the cutting teeth on the perimeter of the cutting disks 52, 54 to cut in a scissors action.

The drive pins 30 oscillate rapidly as the tool is driven causing a corresponding vibration of the tool. The magnitude of the vibrations is directly dependent on the unbalanced mass of the oscillating components. Because the drive pins 30 represent the largest proportion of the unbalanced mass, in the present design they are hollow for maximum strength at a minimum weight, thereby reducing vibration and operator fatigue.

The assembled drive mechanism mounts within the main body 10 and is covered by the drive mechanism cover 46, which is attached to the main body via two screws 49, only one of which is shown.

Figure 2:
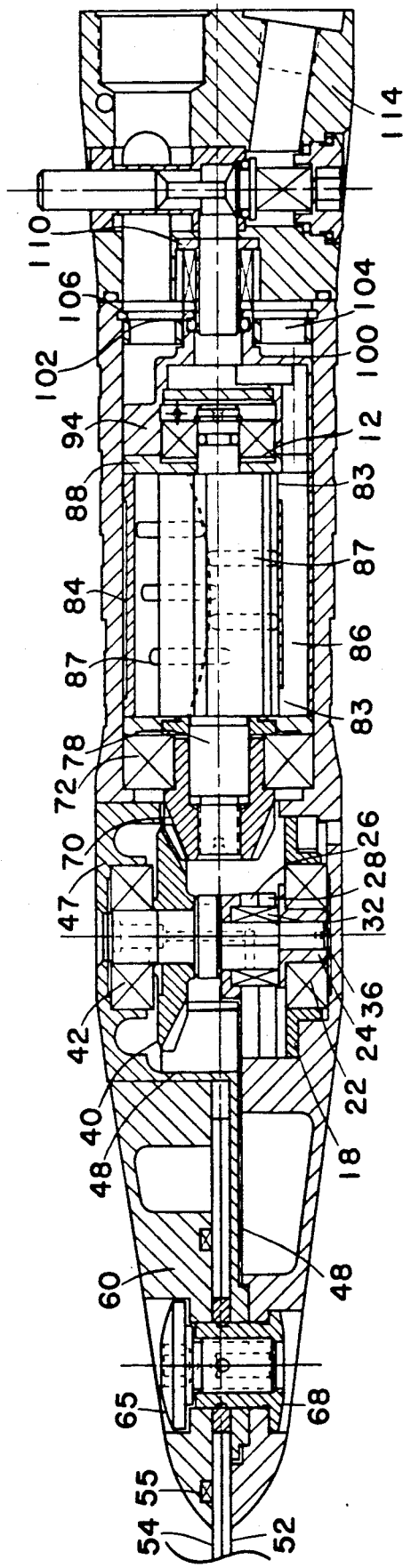
FIG. 2 is a cross-sectional view of an assembled skinning knife. This view is taken along the centerline of the assembled skinning knife in the direction shown along line II—II in FIG. 1.

The drive mechanism cover 46 comprises a drive mechanism cover portion 47 and a barrier plate portion 48. These two portions substantially seal the drive mechanism inside the main body 10. The cutting disks 52, 54 are located on one side of the barrier plate, in contact with the flat portion thereof, and the drive mechanism is protected against contamination on the other side of the barrier plate 48. The pushrods are located beneath the flat horizontal portion of the barrier plate, and the gearing assembly is located behind the upstanding wall portion thereof 48', seen best in FIG. 2.

The main drive gear 40 has inwardly facing teeth and is driven by the motor through the pinion gear 70 shown to the right of the handle 12 in FIG. 1. Because the main drive gear 40 is mounted on the same side of the pinion gear 70 as the drive mechanism cover 46, the complete drive mechanism including all elements 22-40 may be removed from the housing merely by removing the drive mechanism cover 46.

Prior art designs which formed the barrier plate as an integral part of the housing, mounted the drive gear on the opposite side of the pinion gear 70 from the drive mechanism cover. Thus, the pinion span prevented the removal of the drive mechanism until after the motor had been removed.

A further advantage of the design seen in FIG. 1 is that the removable drive mechanism cover is integrally formed in a single piece with the barrier plate portion 48.

The barrier plate 48 serves not only as a barrier against the entry of contaminating material, but also as a flat bearing surface against which the cutting disk 52 slides. This large flat bearing surface stabilizes the cutting disks and prevents them from twisting during use. Accordingly, to minimize wear, the barrier plate is preferably made of a harder material than the remainder of the housing. Prior art designs which incorporated the barrier plate into the housing were required to make the housing and the barrier plate of the same material. As a result, additional processing steps were required to properly harden the face of the barrier plate and prevent undue wear.

In the present invention, both the drive mechanism cover portion 47 and the barrier portion 48 are preferably made of steel. Moreover, the steel forms an excellent material for receiving the bearing 42, and in the event bearing 42 locks up, the damage caused will be less than if the drive mechanism cover were manufactured of aluminum. If the damage is excessive, the drive mechanism cover may easily be replaced.

The cutting disks 52, 54 rotate around blade spacer 50 which is prevented from rotation by pin 51 locking the blade spacer 50 to the barrier plate 48. The cutting disks are held together and pressed against the bearing surface portion of barrier plate 48 by corrugated spring 56 which is positioned between the cutting disks and the second blade cover 60.

The cutting disks and second blade cover 60 are accurately held in alignment with the housing and cutting blades by means of a cutting disk alignment shaft 68 which passes through the center of the cutting disks and whose machined outer surface contacts the interior of the receiving openings on both of the blade covers. The cutting disk alignment shaft 68 is held in position by locking screw 66, and washer 62. Grease fitting 64 permits lubrication of the blades and blade spacer assembly.

In prior art designs, part of the alignment shaft was included on the locking screw 66. Accurate alignment was dependent upon the proper centering of the screw threads on the locking screw 66 with the centerline of the alignment shaft 68. The tolerance requirements of screw threads made this difficult to achieve.

In the present design the alignment shaft 68 contacts both blade covers as well as the blade spacer 50 Accordingly, it depends only upon the tolerance between the exterior of the shaft 68 and the interior of the receiving holes, which is much tighter than screw thread tolerances and not subject to the centerline error. The locking screw 66 serves to prevent the alignment shaft 68 from loosening, but does not serve to align the covers.

A further improvement over the prior art is the use of the inner support stop 58 mounted on the second blade cover 68. This support stop bears against the flat portion of barrier plate 48 between the notched area of the cutting disks 52, 54 and the upstanding wall portion 48' of the barrier plate. This support stop 58 prevents the second blade cover 60 from distorting or bending when the tool is accidentally dropped or mishandled. Such mishandling could possibly bring the blade cover 60 into contact with the oscillating cutting disks in the absence of the support stop.

The present invention also incorporates several improvements to the pneumatic motor and manifold shown in disassembled form on the right side of FIG. 1. The pneumatic motor drives pinion gear 70 which is mounted on the rotor shaft 78. The rotor shaft 78 spins between rotor bearings 72 and 94. Rotor vanes 80 are attached to longitudinal slots in the rotor shaft 78 and the entire assembly spins in drive chamber 85 within the motor casing 84.

The drive vanes 80 spin in close proximity to the inner surface of the drive chamber 85. High pressure air is directed into the drive chamber via drive vents 83 which in the preferred embodiment are located at each end of the casing 84. As the rotor spins, the pressurized air between adjacent vanes is brought around the casing to the exhaust vents 87, formed as slots in the casting and best seen in FIG. 2. As a vane begins to sweep over each exhaust vent, the high pressure air behind the vane begins to escape through the vent producing a burst of noise. When the exhaust vents are aligned with one another, as in some prior art designs, the noise from each vent reinforces the noise from every other vent.

As those who have operated pneumatic tools know, the operating noise can be highly objectionable when the tool is used for long periods of time. Accordingly, the present invention staggers the exhaust vents and overlaps them such that the first exhaust vent begins venting before a second vent begins venting, and the second vent begins venting before the first is fully exposed by the passage of the drive vane. In this way, the noise initially produced by each exhaust vent occurs at a slightly different time from the noise from every other vent. This spreads the noise over time and decreases the noise energy in the initial noise spike produced by exhausting the compressed air behind each vane, making the noise produced much less objectionable. In contrast, prior art designs employed either a single exhaust vent or a series of aligned exhaust vents which reinforced one another. In either case, the exhaust noise was maximum.

This overlap and staggering of the exhaust vents has been found to produce a noise level decrease from 95 DBA to 88 DBA when the tool is operated at 6500 cycles per minute.

The rotor shaft 78 projects through the front plate 76, spacer 74, rotor bearing 72 and into the pinion gear 70. The motor casing 84 slides over the rotor 78 and drive vanes 80 and contacts the outer race of rotor bearing 72. The opposite end of the rotor 78 projects through the rear plate 88 (held in place by pin 90), cup springs 92, and into the rear rotor bearing 94.

In prior art designs, the rear rotor bearing was press fitted onto the rotor shaft. This made it impossible to disassemble the motor without special tools. In contrast, in the present invention the rotor is slip fitted into the inner race of the rear rotor bearing 94, where it is held in position with clip ring 96. To prevent slippage between the rotor 78 and the inner race of bearing 94, a ring of elastomeric material such as O-ring 82 is provided which contacts both the exterior of the rotor shaft 78 and the inner surface of the inner race of bearing 94. The O-ring provides enough friction to prevent slippage and undue wear between the shaft and the bearing, while still permitting disassembly by hand. The O-ring is not required as a pneumatic seal of any type.

A further improvement over the prior art relates to the sealing of the pneumatic passageways which bring the pressurized air into the tool to the drive vents 83. In prior art designs, the casing 84 was tightly fitted into the handle 12. Because the casing 84 had an approximately oval cross-section, it had a larger diameter in one direction than in the other. The oval cross-section of the outside of the casing contacted the circular cross-section of inner surface of the handle 12 at two points around the circumference of the casing and thereby formed two chambers inside the handle. Each chamber was bounded by half the inner surface of the handle 12 and half the outer surface of the casing 84. In the prior art design, one of these chambers was used to supply high pressure air to the drive vents. The other was used for conducting the exhaust air away from the exhaust vents.

This design works well in a new tool. However, each time the motor is removed from the handle, the inner surface of the handle bore and the outer surface of the motor casing wear slightly. Gradually the seal between the inlet chamber and the outlet chamber is worn away, permitting the high pressure air on the inlet side to leak directly into the exhaust side around the exterior of the casing.

In contrast, in the present design, the inlet high pressure air is contained entirely within an enclosed piping system which is sealed with face to face seals and does not rely upon the bore diameter of the handle or the external diameter of the casing. The high pressure air is directed from the conventional valve head 114 through air guide 110, into the pressure manifold 100, and through the end plate 88 into the pressure passageway 86 which is entirely formed within the casing 84.

The pressure passageway 86 is connected in a conventional manner to the drive vents 83 which supply the pressurized air to the rotor and vane assembly. At each joint where the pressurized air passes from one component to another on its way from the valve head 114 to the drive vents, the components are assembled with face to face seals, or with O-ring sealed cylindrical connections. The pressure manifold 100 is sealed to the air guide 110 via O-ring 102. The air guide 110 passes through locking flange 104 which is held in the end of the handle 12 by locking ring 106.

Accordingly, there is very little leakage of the pressurized air, resulting in a tool which will run more efficiently and use less air than earlier designs. When compared to such prior art tools, this increased efficiency permits a larger number of tools to be run from the same air supply. Alternatively, where the same number of tools are used, each tool produces more power.

Tools produced according to the prior art are typically operated at an air pressure of 90 pounds per square inch (62 newtons per square centimeter) and consume air at a rate of 22 to 24 cubic feet per minute (0.62–0.68 cubic meters per minute). A tool according to the present invention, producing the same torque at the same operating speed, operates at 35 psi (24 n/cm$^2$) and consumes only 11.5 to 12 cfm (0.33–0.34 m$^3$/min)

The present invention includes a further improvement in the motor mounting design to improve efficiency and minimize wear. In all designs of this type, the motor assembly slides into the handle 12 and contacts an internal stop which holds the motor at the appropriate location relative to the drive mechanism. The proper relative positioning is important to permit an efficient transfer of power through the pinion gear 70 to the main drive gear 40.

To reliably and repeatably obtain the correct position, in the present design the motor is securely held against the internal stop by means of spring member 108 which presses between the valve head 114 and the end of the motor. Prior art designs held the motor in place by bolts which made the positioning of the motor dependent upon how tightly the bolts were tightened.

In a conventional manner, locking ring 106 fits into a groove on the inner edge at the end of handle 12 and prevents the locking flange 104 from pulling out of the end of the handle. Spring member 108 is then inserted around air guide 110 which is inserted into pressure manifold 100, and O-ring 112 is applied just prior to attachment of the valve head 114. Two locking screws 116 (only one of which is shown) pull the valve head 114 tightly against the locking flange 104 holding the complete tool in proper assembly.

It will thus be seen that the objects set forth above, among those made apparent from the preceding description, are efficiently attained and, since certain changes may be made in the above construction(s) without departing from the spirit and scope of the invention, it is intended that all matter contained in the above description or shown in the accompanying drawing(s) shall be interpreted as illustrative and not in a limiting sense.

What is claimed is:

1. A power skinning knife comprising:
    a pair of cutting disks;
    a drive mechanism for driving the cutting disks in opposed cutting oscillations including;
        an eccentric,
        a main drive gear connected to the eccentric, and
        a pair of pushrods, one for each cutting disk, each pushrod being connected between the eccentric and its respective cutting disk;
    a motor for driving the main drive gear; and
    a housing having the drive mechanism and motor mounted therein including:
        a main body comprising an integral handle and first blade cover,
        a second blade cover, and
        a drive mechanism cover mounted on the main body which may be removed form the main body to provide access to the drive mechanism, the drive mechanism cover comprising a drive mechanism cover portion and a barrier plate portion having an upstanding wall portion therebetween, the upstanding wall portion being integral with the cover portion and the barrier plate portion, the drive mechanism being mounted within the housing so as to permit removal therefrom by removing the drive mechanism cover without removing the motor, the pushrods being mounted on one side of the barrier plate and the cutting disks being mounted on the other side of the barrier plate.

2. A power skinning knife according to claim 1 further including a pair of hollow drive pins disposed on the ends of the pushrods to drive the cutting disks, the drive pins projecting through slots in the barrier plate.

3. A power skinning knife according to claim 1 wherein one of the cutting disks bears against the barrier plate portion of the drive mechanism cover, the drive mechanism cover being manufactured of a different material than the main body.

4. A power skinning knife according to claim 3 wherein the drive mechanism cover is manufactured of steel.

5. A power skinning knife according to claim 1 wherein the drive mechanism includes a main bearing held in a bearing mounting member, the bearing mounting member being mounted in the main body and being removable therefrom for replacement or repair.

6. A power skinning knife according to claim 5 wherein the bearing mounting member is manufactured of a different material than the main body.

7. A power skinning knife according to claim 1 further including a cutting disk alignment shaft passing through the center of the cutting disks and contacting both of the blade covers whereby the blade covers, cutting disks and housing are all accurately held in alignment with one another.

8. A power skinning knife according to claim 1 wherein the second blade cover includes an inner support stop supportingly contacting the drive means cover near the perimeter of he cutting disks.

9. A power skinning knife comprising:
a pair of cutting disks;
a drive mechanism for driving the cutting disks in opposed cutting oscillations including;
an eccentric,
a main drive gear connected to the eccentric, and
a pair of pushrods, one for each cutting disk, each pushrod being connected between the eccentric and its respective cutting disk;
a pneumatic motor for driving the main drive gear having:
a pressure manifold,
a casing having a drive chamber, at least one drive vent for directing pressurized air into the inner drive chamber and at least one exhaust vent for directing pressurized air out of the drive chamber,
a rotor located within the drive chamber and having a plurality of drive vanes, and
a pressure passageway formed within the casing and connected at one end of the drive vent and at the other end to the pressure manifold to form a pneumatic air feed system which isolates the air from the rotor until it enters the drive chamber; and
a housing having the drive mechanism and motor mounted therein including:
a main body comprising a handle and first blade cover,
a second blade cover, and
a drive mechanism cover mounted on the main body which may be removed to provide access to the drive mechanism, the drive mechanism being mounted within the housing so as to permit removal therefrom by removing the drive mechanism cover without removing the motor, 10. A power skinning knife according to claim 9 having a reduced operating noise wherein the casing includes a plurality of exhaust vents which begin venting as a vane of the rotor passes over and exposes each vent, the exhaust vents being overlappingly staggered relative to one another such that a first one of the exhaust vents begins venting before a second one of the exhaust vents begins venting, and the second one of the exhaust vents begins venting before the first one of the exhaust vents is fully exposed by the passage of the vane.

11. A power skinning knife comprising:
a pair of cutting disks;
a drive mechanism for driving the cutting disks in opposed cutting oscillations including;
an eccentric,
a main drive gear connected to the eccentric, and
a pair of pushrods, one for each cutting disk, each pushrod being connected between the eccentric and its respective cutting disk;
a pneumatic motor for driving the main drive gear comprising:
a pressure manifold,
a casing having a drive chamber, at least one drive vent for direction pressurized air into the drive chamber and at least one exhaust vent for directing pressurized air out of the drive chamber,
a rotor located within the drive chamber and having a rotor shaft mounted in a rotor bearing and a plurality of drive vanes,
the rotor shaft being slidingly fitted within an inner race of the rotor bearing to permit hand removal therefrom for disassembly, and
a means for preventing slippage mounted on the rotor shaft in contact with the rotor bearing and the rotor shaft to prevent slippage therebetween; and
a housing having the drive mechanism and motor mounted therein including:
a main body comprising a handle and first blade cover,
a second blade cover, and
a drive mechanism cover mounted on the main body which may be removed to provide access to the drive mechanism, the drive mechanism being mounted within the housing so as to permit removal therefrom by removing the drive mechanism cover without removing the motor, 12. A power skinning knife according to claim 11 wherein the means for preventing slippage comprises a ring of elastomeric material mounted on the rotor shaft in contact with the inner race of the rotor bearing and the rotor shaft.

13. A power skinning knife according to claim 11 wherein the rotor is held in assembly with the motor by a removable metallic ring.

14. A power skinning knife according to claim 1 wherein the motor is slidingly held in the handle and a spring member presses against the motor to hold it in position relative to the main drive gear.

15. A pneumatic motor adapted for mounting in the handle of a hand held cutting tool comprising:
a pressure manifold;
a casing having a drive chamber, at least one drive vent for directing pressurized air into the inner drive chamber and at least one exhaust vent for directing pressurized air out of the drive chamber;
a rotor located within the drive chamber and having a plurality of drive vanes; and
a pressure passageway formed within the casing and connected at one end to the drive vent and at the other end to the pressure manifold to form a pneumatic air feed system which isolates the air from the rotor until its enters the drive chamber.

16. A pneumatic motor according to claim 15 having a reduced operating noise wherein the casing includes a plurality of exhaust vents which begin venting as a vane of the rotor passes over and exposes each vent, the exhaust vents being overlappingly staggered relative to one another such that a first one of the exhaust vents begins venting before a second one of the exhaust vents begins venting, and the second one of the exhaust vents begins venting before the first one of the exhaust vents is fully exposed by the passage of the vane.

17. A pneumatic motor according to claim 15 wherein the rotor further comprises a rotor shaft mounted in a rotor bearing, the rotor shaft being slidingly fitted within an inner race of the rotor bearing to permit hand removal therefrom for disassembly, and a means for preventing slippage mounted on the rotor shaft in contact with the rotor bearing and the rotor shaft to prevent slippage therebetween.

18. A pneumatic motor according to claim 17 wherein the means for preventing slippage comprises a ring of elastomeric material mounted on the rotor shaft in contact with the inner race of the rotor bearing and the rotor shaft.

19. A pneumatic motor according to claim 18 wherein the rotor is held in assembly with the motor by a removable metallic ring.

* * * * *